UNITED STATES PATENT OFFICE.

ALFRED KRUPP, OF ESSEN, GERMANY.

MANUFACTURE OF IRON AND STEEL.

SPECIFICATION forming part of Letters Patent No. 234,789, dated November 23, 1880.

Application filed March 10, 1879. Patented in England May 1, 1877, and in Germany July 2, 1877.

*To all whom it may concern:*

Be it known that I, ALFRED KRUPP, (trading under the style or firm of FRIED KRUPP,) of Essen, in the Empire of Germany, cast-steel manufacturer, have invented new and useful Improvements in the Manufacture of Iron and Steel, which invention is fully set forth in the following specification.

My invention consists in cleaning fluid pig-iron from phosphorus, and at the same time from sulphur, silicon, and manganese, by treating it in the following manner: Molten pig-iron is run either direct from the blast-furnace or from a secondary remelting-furnace into a furnace the hearth of which contains oxides of iron or manganese separately or both combined, which have previously been spread over the hearth in the solid form in quantities proportionate to the amount of impurities in the pig. In this furnace, which may be movable or stationary, the fluid pig-iron is exposed to the reactions exercised by these oxides. The latter are dissolved by the cast-iron and rise through it, thus blending together, and at the same time they are mixed up with the fluid iron by any motion of the hearth, or, if this be stationary, by stirring with a rabble. The reaction thus caused has the effect that phosphorus, sulphur, silicon, and manganese are in a few minutes either thoroughly or to a great extent oxidized and carried over into the slag before the carbon of the pig-iron is seriously attacked. When the carbon begins to diminish the cast-iron is tapped and so separated from the oxides and the slag before its liquid state is practically diminished. It may while in the fluid state be run direct into another apparatus, to be there worked into iron or steel of any required quality, according to one of the methods already known.

I am well aware that lining furnaces with iron oxides alone or combined with manganese oxides and cleaning molten pig-iron by means of oxides of iron or manganese has long been a common custom in the puddling process; but there is a great and important difference between this process and my invention. In puddling the product has always been pasty or solid—viz., more or less decarbonized; whereas the characteristic in my proceeding is that a fluid product is obtained, and that the process in the cleaning-furnace is interrupted before the carbon in the cast-iron is so far diminished as to compromise the fluidity of the iron.

The result that my product is fluid is very important, since with fluid masses the manipulation is easier and cheaper than with solid ones, and larger quantities may be operated upon.

Concerning the temperature necessary for my process, I have stated that phosphorus is oxidized at any temperature. I prefer, however, to carry out my cleaning process at a temperature as high as possible, because a high temperature renders the pig and the oxides very liquid, fluidity of substances being the very essence of chemical reaction.

The presence of a certain amount of manganese, whether contained in the pig-iron or added in the form of ferro-manganese, &c., is very useful to my process. I have stated that manganese acts in such a manner as to preserve the carbon of the fluid cast-iron, and so prevents its coming to nature, as happens in the puddling process. Therefore by the presence of manganese the purifying action of the oxides upon the pig-iron may be prolonged; but I declare that the presence of manganese is not indispensable, although the purification will never be so perfect as with manganese.

Having thus generally described the nature of my invention, I give in the following the details which must be observed in the working of the process.

First, concerning the material to be employed, it is obvious that the chemical composition of the pig influences very much its liability to be cleaned according to what I have above remarked of the action of manganese. I prefer pig-iron containing at least 0.5 to 0.8 per cent. of manganese; but I can also clean pig-iron which does not contain any manganese, only the purification will be less perfect.

The more silicon in the pig the greater is the quantity of ore used. I therefore prefer pig-iron with a percentage of silicon below one per cent. The fluidity of the iron being essential to success, I prefer the pig-iron to contain more than 2.7 per cent. of carbon alone, giving to the cleaned cast-iron its fluidity.

Having indicated the conditions of chemical composition which are the most favorable to purification, I desire it to be understood that I do not limit my new process to such pig-iron, but that any pig-iron may be thus treated, although with less success.

The oxides of iron and manganese to be employed may be used in the form of iron ores, manganese ores, hammer and roll scales, purple ore, slags, or any oxides produced by any manufacture, and when speaking here and in the following simply of oxides I wish it to be understood as meaning iron or manganese oxides such as just named.

In the choice of oxides the following considerations will serve as a guide: Silica is a stronger acid than phosphoric acid. It is therefore important that the ores used for the lining and the chemical reaction do not contain too much silica. Fourteen per cent. may be considered as a limit for favorable use. If they contain more, they may be mixed up with calcareous ores, lime being a powerful base, neutralizing the hurtful influence of silicic acid.

The presence of phosphoric acid does not impair the cleaning, because the cleaning is effected by oxidizing reactions, so that any reduction of phosphorus is not to be feared. Care must only be taken that the percentage of phosphoric acid does not approach the degree of saturation of the cleaning-slag, since this latter is only able to take up a certain percentage of phosphoric acid, which varies with the composition of the pig-iron under treatment from about six to twenty-three per cent.

I advise to make in the choice and application of ores and oxides a separation of those for the lining and repairs and those for additions. The former should be somewhat refractory and rather rich in iron oxide. The latter may be the same, but are also allowed to be poor and fusible.

The consumption of ore for repairs of lining is about six per cent. of the weight of the pig-iron cleaned. The consumption of ore for additions is from twelve to twenty-four per cent., increasing in proportion to the phosphorus of the pig-iron treated, which I presume here to contain from 0.6 to 2.5 per cent.

I never melt the pig-iron which is to be cleaned in the cleaning-furnace itself, as is done generally in the puddling process. The reason why I proceed in another way lies in the quickness with which the reactions of the oxides upon phosphorus, &c., are performed, so that if I should melt the pig-iron in the cleaning-furnace itself the first molten part would be refined and already decarbonized to a high degree before the last part of the pig-iron is melted. The same reason induces me to run the molten cast-iron into the cleaning-furnace as quick as possible.

Large masses being easier kept fluid for some time than small ones, I prefer to refine at once charges of not less than five tons in weight.

Any furnace the hearth of which is composed of the aforesaid oxides may serve for my cleaning process, such furnace being stationary, rotating, revolving, or oscillating, or having any other motion communicated to it. If the hearth is fixed, the bath must be stirred mechanically or by hand. I prefer furnaces with movable hearth, and especially the Pernot system, which has answered exceedingly well. The iron-cased hearth does not require any artificial cooling. The lining should be made of such a thickness that the charge may not pierce through it. From eight to sixteen inches will generally be found sufficient.

When preparing the lining the iron-cased hearth is first covered with ore in the cold state so far that the iron bottom and walls will not be burned by the flame. The walls can even be built up quite thick with iron-stones. The fire is then set into the furnace, and when the temperature has risen sufficiently to melt small oxides, which are then thrown in, the bottom and walls are fed up with small ores, &c., until they have the thickness desired, being fixed in layers by cooling down every layer after it has been melted. A hearth prepared in this manner lasts for months and needs but little repairs after each charge.

At least half an hour before I run in a charge of cast-iron I spread over the hearth (which has been prepared in the manner described) small common ores or other oxides, which are destined for the reaction upon the cast-iron, and are to be considered as additions. The weight which is needed of these additions increases in proportion to the amount of phosphorus of the pig-iron heated, and varies from about twelve to twenty-four per cent. of the weight of the pig-iron charge if the latter contains from 0.6 to 2.5 per cent. of phosphorus. After the heat has caused these additions to adhere to the bottom and walls of the hearth the charge is run upon them into the hearth. In proceeding thus there is not much ore torn off mechanically from bottom and walls, but the cast-iron charge dissolves for itself as much of the oxides as it needs for its purification, the oxides being obliged to pass gradually as they melt through the cast-iron. By these means I cause the reaction not to develop in a too rapid and explosive manner, so that the metal does not run over the walls of the hearth or is not thrown out. All these inconveniences would take place if I introduced the oxides in the molten state at the same time as or before the cast-iron, and by proceeding in the latter manner it would not be possible to treat large quantities at once, neither to maintain a regular and economic working.

When the charge has been run at once into the furnace it remains generally almost quiet for about three to eight and even more minutes. This is the first period of reaction in my process where phosphorus, sulphur, silicon, and manganese are oxidized. This oxidation forms liquid products—viz., phosphates and silicates of protoxide of iron and silicate of protoxide of manganese. Sulphur only, if present, is oxidized partly to gaseous sulphurous acid, but partly it combines with iron and manganese as a liquid product, sulphide of iron or manganese. Therefore the bath remains almost untroubled and only little froth and bubbles are formed; but as soon as the above substances have been oxidized (phosphorus and sulphur, for the most part, silicon and manganese throughout, or at least except minimal traces) the oxygen of the oxides acts with all its power upon the carbon. It forms with the carbon a gaseous product—carbonic oxide—causing thus a revolution in the whole bath. The molten mass commences to rise, and froth and foam are formed or bubbles thrown out, which burn upon the surface of the bath to carbonic acid with bluish flames. All these signs are very conspicuous, so that every intelligent workman may recognize the moment for tapping. A short delay in tapping presents no inconvenience. On the contrary, it gives the guarantee that almost all phosphorus has been removed, especially if the pig-iron treated contained some manganese. It is not to be feared that by suspending the tapping for some minutes the metal might come to nature.

When the charge is tapped the fluid metal may be very easily separated from the fluid and impure slag, which is of a far lighter specific gravity. It may be received in a large ladle and be transported therewith to any (even distant) finishing-furnace, and be run therein fluid direct from the ladle, care being taken to run it from the bottom side of the ladle in such a way that the impure slag is is cut off.

The finishing-furnace may be a Siemens steel-melting or a Pernot steel-melting furnace, which latter answers exceedingly well for the transforming of my cleaned iron into steel and mild steel, or it may be any other melting-furnace, or it may be a puddling-furnace like Dank's, Bouvard's, &c., or any other furnace for finished products. The cleaned iron may also be cast direct into chills as cleaned pig-iron, and so transported to distant works.

It is not the place here to enumerate the technical and commercial advantages when working my cleaned cast-iron instead of pig-iron; but I may mention here that my process is of great importance for rotary puddling-furnaces like Dank's, &c., those furnaces having failed hitherto for the sole reason that the raw pig-iron cut up the lining.

Instead of running the cleaned iron from the ladle direct into the finishing-furnace, it may also be run into a receiver-furnace with silicious hearth, and kept there as long as wished for, and brought from there for the finishing-furnaces at any time and in any weight. After the charge has been tapped from the cleaning-furnace the first melter inspects the lining and repairs it with some small ore; then he heats well and waits till the fresh ore is adhering to the lining. After this he throws in the addition ores for the next charge, and all goes on again as described before.

With one Pernot furnace there can be made per twenty-four hours about sixteen charges of about five to ten tons each. The work is so regular and the repairs so easy that a second or reserve furnace is not even necessary for a regular working plant.

I am aware that melted pig-iron and melted oxide of iron have been run together for the purpose of freeing the iron of impurities, such as phosphorus and silicon; but the oxidation is so sudden that the bath is liable to boil over, and it is difficult to conduct the process with regularity.

By my improvement this danger is prevented and the process is rendered gradual and uniform.

I claim as my invention—

The process of freeing iron of such impurities as phosphorus, sulphur, or silicon, which consists in introducing oxide of iron in a solid state upon the hearth before the introduction of each charge of molten iron, and allowing the molten charge to remain upon the hearth until the impurities have been taken up by the oxide, when the carbon begins to burn, and then withdrawing the charge into a second furnace or receptacle for subsequent treatment in the production of steel or puddled iron, substantially as set forth.

ALFRED KRUPP.

Witnesses:
  EMIL SCHMIDT,
  CARL REUTER.